Patented June 10, 1941

2,245,418

UNITED STATES PATENT OFFICE 2,245,418

CONCENTRATED VITAMIN D IN EVAPORATED MILK AND PROCESS OF PRODUCING THE SAME

Reginald C. Sherwood, St. Paul, and Charles G. Ferrari, Minneapolis, Minn., assignors to General Mills, Inc., a corporation of Delaware No Drawing. Application July 21, 1938, Serial No. 220,506

3 Claims. (Cl. 99—11)

The present invention relates to a vitamin concentrate which may be added to food products to impart vitamin D properties thereto and more particularly to a process of producing such vitamin concentrate.

The principal object of our invention is to facilitate the fortification of food products with a vitamin concentrate.

Another object of our invention is to provide an economical and effective process of imparting vitamin D to food products, especially to cereals and dairy products.

A further object of our invention is to produce a fat-solution of a vitamin concentrate uniformly dispersed in evaporated milk, in which the milk serves as a vehicle for the fat and the fat serves as a solvent for the vitamin.

A still further object of our invention is to provide a butter-fat concentrate of vitamin D which is especially adapted to be added to dairy products such as milk thus avoiding the addition of a foreign fat to the milk.

These and other objects and advantages of our invention will be more readily apparent from a consideration of the following detailed specification in conjunction with the appended claims.

It has heretofore been customary to impart vitamin D properties to dairy products such as milk, by exposing the milk or other product to the action of ultra-violet radiant energy. The sterols present in the milk were changed by the ultra-violet radiant energy to vitamin D. According to the commercial application of this method of treatment, it was necessary to expose the milk in a thin film to the ultra-violet radiant energy. This method necessitated the use of considerable expensive equipment, such as means for producing the thin film of milk, and electrical equipment to produce the ultra-violet radiant energy. This equipment necessarily occupied considerable space in the plant in which it was installed. Frequently milk treated by this method will have a foreign flavor imparted thereto. In addition to the action on the sterols in the milk, the ultra-violet radiant energy causes certain undesirable chemical reactions to occur in the milk which limits to a lower level than is desirable, the antirachitic activity of the irradiated milk.

Also, it has been customary to impart vitamin D properties to milk and other dairy products by adding thereto fish-oil concentrates of vitamin D. However, this method was disadvantageous in that it adversely affected the flavor of the milk by imparting a fish-oil flavor and odor thereto.

Our invention is based upon the discovery that the above-mentioned difficulties may be obviated and that a sterile, potent vitamin D concentrate may be prepared which when added to other products, such as milk, results in the product having no foreign taste, odor, or foreign fat imparted thereto by a process which will be hereinafter described.

Broadly, our process comprises dissolving activated ergosterol, in suitable quantity, in butter-oil (butter-fat), thereby producing a butter-fat concentrate of vitamin D, bioassaying the concentrate to establish its vitamin potency, melting a weighed quantity of the concentrate, and homogenizing the concentrate with a small quantity of previously prepared evaporated milk, then adding the homogenized product to a vat containing a large bulk of evaporated milk which is to be fortified, then uniformly distributing the concentrate in the evaporated milk by mixing, and then homogenizing, canning and sterilizing the product, in the usual manner.

In practicing our invention we dissolve previously activated ergosterol in butter-oil or butter-fat, thereby producing a butter-fat concentrate. This concentrate may contain from 100,000 to 1,000,000 U. S. P. units of vitamin D per gram of butter-oil or butter-fat. This concentrate is then bioassayed to determine its vitamin D potency. A required quantity of this concentrate is then melted and mixed with a small quantity of evaporated milk, in the proportion of approximately 5 pounds of butter-fat concentrate to approximately 1 to 2 gallons of unsterilized evaporated milk, which is removed from a milk vat prior to its sterilization and canning. This product is then homogenized or emulsified by any suitable means, such as passing it through an Eppenbach emulsifier or other suitable small laboratory emulsifiers. This emulsified product is then added to the vat of milk which it is desired to fortify with vitamin D and thoroughly mixed therewith by any suitable means. This fortified concentrated product is then subjected to the remaining steps required to produce canned evaporated milk—namely, it is passed through a plant homogenizer, canned, and sterilized in the usual manner.

This fortified vitamin D evaporated milk concentrate may then be used to fortify other untreated milk, cereal products, or other foods, by adding a suitable quantity of it to such milk, products or other foods. For example, we prepare a vitamin D evaporated milk concentrate in a 5.8 ounce can containing 60,000 U. S. P. units of vitamin D, sufficient to fortfy 1500 quarts of milk at the rate of 400 U. S. P. units per quart, which is the quantity recommended by competent scientific authority.

When our improved vitamin D containing concentrate is used by dairies to fortify milk with vitamin D, no expensive or elaborate equipment is required since it is only necessary to measure the required amount of vitamin D concentrate in a graduate and pour it directly into the pasteurizing vat preferably just prior to pasteurization. The vitamin D is already homogenized in the evaporated milk and complete dispersion throughout the bath of milk to be vitaminized is obtained by the agitation received by the milk during pasteurization. Furthermore, no disagreeable taste or odor is imparted to the milk by the addition of the vitamin concentrate thereto and the vitamin D is not impaired by the heat to which the milk is subjected during the pasteurization process.

By using our improved vitamin D concentrate for the fortification of milk, a natural product, namely, butter-fat is added to a natural product, namely, milk. Since both products are natural products which are mutually compatible, the food value of the resulting product is enhanced. Also evaporated milk is a natural colloid and forms an ideal food substance for dispersing homogeneously butter-fat containing vitamin D and keeping the vitamin in homogeneous dispersion until it is used.

The milk in our invention does not merely serve as a carrier for the vitamin. The milk imparts its food value when consumed by the consumer and the butter-fat solution not only imparts the vitamin D property to the milk, but also cooperates with the milk to increase its nutritional qualities as stated above. In other words, there is a mutual cooperation between the milk and butter-fat solution.

By "vitamin concentrates" is meant preparations having a potency higher than that of foods irradiated or fortified to increase their vitamin content and which are intended to be consumed by humans as ordinary foods. For purposes of illustration, a preparation having a vitamin D potency of five hundred units per gram and which is intended for use in fortifying articles of food, as for instance candy, is a vitamin D concentrate. Of course, the actual potencies of concentrates made in accordance with this invention may vary over wide ranges, as will be evident to those skilled in the art.

The following specific example will serve to illustrate and explain a use of our invention. To prepare 300 pounds of bread requires approximately 1 barrel of flour (weighing about 200 pounds.) If it is desired to prepare bread containing 500 U. S. P. units of vitamin D per pound of bread, the baker proceeds with the preparation of a dough mix according to the usual formula and procedure in which yeast and water are first mixed to form a suspension. After the yeast and water have been mixed together, 104 cubic centimeters of vitamin D concentrate in evaporated milk, produced as described above, containing 1600 U. S. P. vitamin D units per cubic centimeter, is measured out and added to the previously formed yeast suspension. This quantity is 10%, by volume, in excess of the amount required to produce bread containing 500 U. S. P. vitamin D units per pound, the excess being added to compensate for possible losses in baking, etc. The concentrate and yeast suspension are stirred together and then mixed with other ingredients required in bread-making to form a dough which may be baked in the customary manner.

It is specifically intended to exclude extracts from natural sources, sometimes called concentrates of vitamin D. The term "concentrate" is there used in a literal sense which implies that a preparation has been extracted from a less potent natural source. We wish to exclude these concentrates since they carry with them objectionable odors and flavors from their original sources, usually fish oils. As compared with the activated ergosterol, used in this invention, the vitamin D of a concentrate is distinct and different which can be demonstrated by biological tests and which has been recognized by authorities in this field. This is further indicated by the fact that the vitamin D of activated ergosterol is known always in the chemical literature as vitamin $D_2$, whereas cod liver oil vitamin is primarily vitamin $D_3$. For example, the article by Rygh, Nature, 136; 3436:396–7 (1935) calls activated ergosterol, vitamin $D_2$ and this article further points out the non-identity of vitamin $D_2$ and the natural vitamin D from cod liver oil. It is believed that the name "vitamin $D_3$," was first assigned by Windaus, Schenk and Wirder, Hoppe-Seyler's Zeitschrift für Physiologische Chemie 241: 100–103 (1936). In this article, the name "vitamin $D_3$" is assigned to activated 7-dehydrocholesterol which was shown to be the same as the vitamin D from tuna fish liver oil.

The foregoing detailed description has been given for clearness of understanding only and no unnecessary limitations should be understood therefrom, but it should be construed as broadly as permissible in view of the prior art.

We claim as our invention:

1. A process of producing a sterile emulsion of fortified evaporated milk concentrate of vitamin $D_2$ which consists in dissolving activated ergosterol in butter fat, and then uniformly dispersing the butter-fat concentrate in a vehicle consisting of evaporated milk, and canning and sterilizing the resulting product.

2. A process of producing a sterile emulsion of fortified evaporated milk concentrate of vitamin $D_2$ which consists in dissolving activated ergosterol in butter-oil, uniformly dispersing the butter-oil concentrate in a vehicle consisting of evaporated milk, and then incorporating the vehicle and vitamin concentrate in a bulk of untreated evaporated milk and homogenizing the vehicle, vitamin concentrate and evaporated milk to produce a highly fortified evaporated milk product, and canning and sterilizing the resulting product.

3. A sterile liquid emulsion of vitamin $D_2$ concentrate consisting of activated ergosterol, a butter-fat vehicle therefor, and an evaporated milk carrier for both the vehicle and the ergosterol.

CHARLES G. FERRARI.
REGINALD C. SHERWOOD.

CERTIFICATE OF CORRECTION.

Patent No. 2,245,418. June 10, 1941.

REGINALD C. SHERWOOD, ET AL.

It is hereby certified that error appears in the printed specification of the above numbered patent requiring correction as follows: Page 2, first column, line 2, for "60,000 U. S. P." read --600,000 U. S. P.--; line 3, for "fortfy" read --fortify--; line 16, for the word "bath" read --batch--; and that the said Letters Patent should be read with this correction therein that the same may conform to the record of the case in the Patent Office.

Signed and sealed this 29th day of July, A. D. 1941.

Henry Van Arsdale,
Acting Commissioner of Patents.

(Seal)